United States Patent [19]

Ohki et al.

[11] Patent Number: 4,532,890

[45] Date of Patent: Aug. 6, 1985

[54] PET LITTER

[75] Inventors: Tomio Ohki; Toshio Yoshioka, both of Yokohama, Japan

[73] Assignee: Nippon Pet Food Company, Ltd., Japan

[21] Appl. No.: 593,811

[22] Filed: Mar. 27, 1984

[30] Foreign Application Priority Data

Apr. 5, 1983 [JP] Japan .................................. 58-59752

[51] Int. Cl.$^3$ ............................................. A01K 1/015
[52] U.S. Cl. ....................................................... 119/1
[58] Field of Search ............................................. 119/1

[56] References Cited

U.S. PATENT DOCUMENTS

| 2,708,418 | 5/1955 | Sugarman et al. | 119/1 |
| 3,828,731 | 8/1974 | White | 119/1 |
| 3,923,005 | 12/1975 | Fry et al. | 119/1 |
| 4,258,660 | 3/1981 | Pris et al. | 119/1 |

Primary Examiner—Hugh R. Chamblee
Attorney, Agent, or Firm—McGlew and Tuttle

[57] ABSTRACT

A pet litter formed by pelletizing a mixture of a chopped paper material and a material having a high content of chlorophyll.

6 Claims, No Drawings

PET LITTER

DESCRIPTION

This invention relates to a pet litter.

Excretion by pets such as cats, dogs, birds, and other animals kept in doors is usually done in a place such as a box covered with paper and sand, and causes such problems as filling the room with an unpleasant odor due to excrements (liquid and solid wastes) absorbed in the paper and sand, which have high water absorption properties, but do not have deodorizing effects, as having dirtying the room because the paper, sand and the like stick to the pet's legs after excretion, and being a problem to dispose of as waste. Thus, improvements in a pet litter have been in great demand.

Recently, it has been known to use pellets of alfalfa having a high content of chlorophyll, which are formed by drying, grinding and solidifying alfalfa, as a litter by the application of the deodorizing function of chlorophyll. However, on the one hand, while the pellets have good water absorption properties and deodorizing effects, on the other hand, they have the drawback that they break apart immediately after water absorption to form a slurry which is liable to adhere to the pet's legs.

Recently, it has also been proposed to use a material formed by molding pulverized zeolite to a uniform size, for example a granular material, as a litter by the application of high water absorption properties and the deodorizing effects due to zeolite (Japanese Patent Application Laid-Open No. 129622/1982). However, while the litter for use for excretion may be flushed into the waste system after use, it is undesirable to flush the litter after use in that the zeolite used for the litter and the bentonite added thereto are both mineral materials and are deposited at the bottom of septic tanks without being dissolved in water and without being subjected to microbial degradation.

This invention has been made by taking the above problems into consideration. It is an object of this invention to provide a litter which is capable of solving the above problems, and is soluble and degradable when flushed into the waste system, thereby causing no problems. This invention will be further explained in detail.

Various paper materials having high water absorption properties, such as newsprint, wastepaper, pulp waste, and the like, may widely be used as the chopped paper material to be a substrate for the litter of the present invention. These paper materials are chopped for use for molding, preferably to a size less than 0.3 mm.

According to the present invention, materials having a high content of chlorophyll such as alfalfa grass, stems and leaves of leaf meal such as ipilipil niseacacia, and algae such as Spirulina scenedesmus, are ground to such a size as to be suitable for mixing with the chopped paper material for molding, added to the chopped paper material, and mixed therewith. The material having a high content of chlorophyll may be added in an amount of 1 to 70% by weight based on the amount of the paper material. The above mixing may preferably be performed by adding a small amount of a sizing agent having thickening properties such as an acrylic polymer (sodium polyacrylate), carragenan, guar gum, sodium alginate, acrylamide of starch, carboxymethylcellulose (CMC) or the like, and further adding a suitable amount, preferably 1.0 to 1.2 times by weight, of water. The kind and amount of the sizing agents to be used may be selected depending on the amount of water absorbed in the litter and on the degree of dissolution and degradation after water absorption in the litter.

The resulting mixture as above is extruded through a die of a suitable size in an extruder for molding to a size having a diameter of from about 2 to 10 mm. The molded product thus obtained is dried for use in a pet litter.

The litter composed of the above molded product contains chlorophyll having deodorizing effects, and has such advantages that the unpleasant odor from excrements is greatly reduced when excretion by the pet is done in a place covered with the litter, that the litter swells only after absorbing water and that the shape of the litter does not break so as to adhere to the pet's legs. The litter, by absorbing the water in excrements, swells and is softened, so that the litter may easily be flushed into the sewage system, and that the litter is subjected to microbial degradation, resulting, as described above, in no deposition in septic tanks. The pet litter of the present invention, as described above, is capable of overcoming disadvantages in conventional litter, and can be prepared at a low cost by a relatively simple procedure, providing advantages in the treatment of pet excrements.

The present invention will be explained more in detail by the following examples:

EXAMPLE 1

Alfalfa pellets separately prepared to a size less than 0.5 mm, and "Akuakeep 10SH" (The trademark of an acrylic polymer of Seitetsu Kagaku Co., Ltd.) as a sizing agent were added to wastepaper chopped to a size less than 0.28 mm in the following proportions:

Wastepaper—67% by weight
Alfalfa pellets—30% by weight
Alkuakeep 10SH—3% by weight To 100 parts by weight of the resulting mixture as above, 110 parts by weight of water was added for extruding by an extruder having a 4.8 mm die. The resulting molded product was dried in a fludized bed dryer to the extent that the water content therein was less than 12% by weight to obtain a final product as a litter.

Table 1 shows the results of the water absorption rate and deodorizing effects of the final product as a litter in comparison with two conventional products.

TABLE 1

| Type of Litter | Water Absorption Rate (%) | Base-exchange Capacity (meq./100 g) |
|---|---|---|
| Final product of Example 1 | 260 | 157.9 |
| Product composed of zeolite having a particle size of from 4 to 4.5 mm | 51 | 150.7 |
| Product composed of alfalfa pellets | 100 | 163.8 |

NOTE:
Base-exchange Capacity was determined by a semi-micro method improving upon Schollenberger's method.

EXAMPLE 2

To the same chopped wastepaper as used in Example 1, leaf meal of ipil ipil and CMC as a sizing agent were added for mixing in the following proportions:

Wastepaper—45% by weight

Leaf meal—50% by weight

CMC—5% by weight

To 100 parts by weight of the resulting mixture as above, 100 parts by weight of water was added for extruding to be molded by a pelletizer having a 7.2 mm die. The resulting molded product was dried in a fluidized dryer to a water content of 12% by weight to obtain a final product.

The results of the water absorption rate and deodorizing effects for the final product as above and for a litter product composed of zeolite having a particle size of from 6.5 to 7 mm are shown in Table 2.

TABLE 2

| Type of Product as a Litter | Water Absorption Rate (%) | Base-exchange Capacity (meq./100 g) |
|---|---|---|
| Final product of the present invention | 176 | 162.5 |
| Zeolite | 65 | 150.7 |

As seen in Table 2, the litter of the present invention is excellent as compared with the zeolite as a comparison.

What is claimed is:

1. A process for the preparation of a pet litter, which process comprises adding to a chopped paper material for mixing, water and a ground product or pellets with a high content of chlorophyll selected from the group consisting of alfalfa grass, stems and leaves of ipil ipil niseacacia, and Spirulina scenedesmus in an amount of from 1 to 70% by weight based on the amount of the chopped paper material, pelletizing the resulting mixture and drying the resulting molded product.

2. The process as claimed in claim 1, wherein water is added thereto in an amount of from 0.1 to 1.2 times by weight based on the amount of the mixture of the chopped paper material with the ground product or pellets of the material having a high content of chlorophyll.

3. The process as claimed in claim 1, wherein the resulting mixture is molded by extrusion into a pelletized, molded product.

4. A process for the preparation of a pet litter, which process comprises adding to a chopped paper material for mixing, water and a ground product or pellets with a high content of chlorophyll selected from the group consisting of alfalfa grass, stems and leaves of ipil ipil niseacacia, and Spirulina scenedesmus in an amount of from 1 to 70% by weight based on the amount of the chopped paper material, and a sizing agent selected from the group consisting of sodium alginate, sodium polyacrylate, carrageenan, guar gum, acrylamide of starch and carboxymethylcellusose, pelletizing the resulting mixture and drying the resulting molded product.

5. The process as claimed in claim 4, wherein water is added to the chopped paper material in an amount of from 1.0 to 1.2 times by weight based on the amount of the mixture of said chopped paper material with the ground product or pellets with a high content of chlorophyll.

6. The process as claimed in claim 4, wherein the resulting mixture is molded by extrusion in a pelletized, molded product.

* * * * *